United States Patent [19]

Wenzel

[11] 4,455,924
[45] Jun. 26, 1984

[54] OVEN FOR COOKING AND FLAVORING MEAT PRODUCTS

[75] Inventor: Robert J. Wenzel, South Beloit, Ill.

[73] Assignee: Alco Standard Corporation, Valley Forge, Pa.

[21] Appl. No.: 428,961

[22] Filed: Sep. 30, 1982

[51] Int. Cl.³ .......................... A23B 4/04; A23L 1/00
[52] U.S. Cl. ........................................ 99/333; 99/342; 99/468; 99/474; 99/482; 126/21 A; 219/400; 219/401; 312/31; 312/236; 426/418; 426/523
[58] Field of Search .......... 99/467, 342, 468, 473-482, 99/331-333; 126/198, 369, 193, 21 A; 312/31, 236, 31.1, 31.2; 426/418, 496; 219/401, 400, 386

[56] References Cited

U.S. PATENT DOCUMENTS

| | | | |
|---|---|---|---|
| 3,763,767 | 10/1973 | Baker et al. | 99/482 X |
| 3,955,007 | 5/1976 | Roderick | 426/418 |
| 4,039,776 | 8/1977 | Roderick | 219/401 |
| 4,062,983 | 12/1977 | Roderick | 426/418 |
| 4,130,052 | 12/1978 | Jacobson | 99/339 |
| 4,244,979 | 1/1981 | Roderick | 99/474 X |
| 4,344,358 | 8/1982 | Maurer | 99/482 X |

Primary Examiner—Timothy F. Simone
Attorney, Agent, or Firm—Leydig, Voit, Osann, Mayer & Holt

[57] ABSTRACT

A forced air convection oven for use by restaurants and delicatessens for cooking ribs and other meat products. Liquid smoke or other liquid flavoring agent is sucked from a container, is atomized and is sprayed into the cooking chamber of the oven to impart a desired flavor to the meat.

8 Claims, 7 Drawing Figures

OVEN FOR COOKING AND FLAVORING MEAT PRODUCTS

BACKGROUND OF THE INVENTION

This invention relates to an oven for cooking and flavoring meat products such as ribs, poultry, brisket and the like.

More particularly, the invention relates to an oven adapted for use in restaurants and delicatessens and adapted to impart a smoked or barbeque flavor to the meat as the meat is being cooked. Typically, such ovens in the past have utilized hickory or other wood blocks or chips which produce the desired smoke when the oven is heated and the resins of the wood are vaporized. The wood blocks or chips create ash and other residue in the oven and thus the oven must be cleaned frequently in order to remove the ash. In addition, a new supply of blocks or chips must be placed in the oven periodically and must be loaded into the oven in substantially uniform quantities in order to keep the flavor of the meat consistent from batch-to-batch.

SUMMARY OF THE INVENTION

The general aim of the present invention is to provide a new and improved oven which is especially adapted for commercial use in restaurants, delicatessens and the like and which is particularly characterized in that it utilizes a clean, non-polluting and easy-to-handle liquid flavoring agent for imparting a smoked flavor or other desired flavor to the meat as the meat is being cooked.

A more detailed object of the invention is to provide a forced hot air convection oven in which the meat may be cooked efficiently with little shrinkage and in which a liquid flavoring agent is automatically injected into the oven at periodic intervals in order to impart a desired flavor of substantially uniform consistenxy to the meat.

Another object of the invention is to provide relatively simple and trouble-free apparatus for sucking the liquid flavoring agent from an easily fillable container, for atomizing the flavoring agent and for spraying the flavoring agent into the cooking chamber of the oven in the form of a fine mist.

Still a further object is to provide a convection oven whose panels and interior components may be easily removed for cleaning and servicing.

The invention also resides in the unique interior construction of the oven to maintain a constant flow of air within an air circulation chamber which extends around the cooking chamber, the constant flow of air maintaining a consistent temperature in the cooking chamber while promoting heating efficiency and product consistency and while reducing product shrinkage.

These and other objects and advantages of the invention will become more apparent from the following detailed description when taken in conjunction with the accompanying drawings.

DETAILED DESCRIPTION OF THE PREFERRED EMBODIMENT

Figure 1:
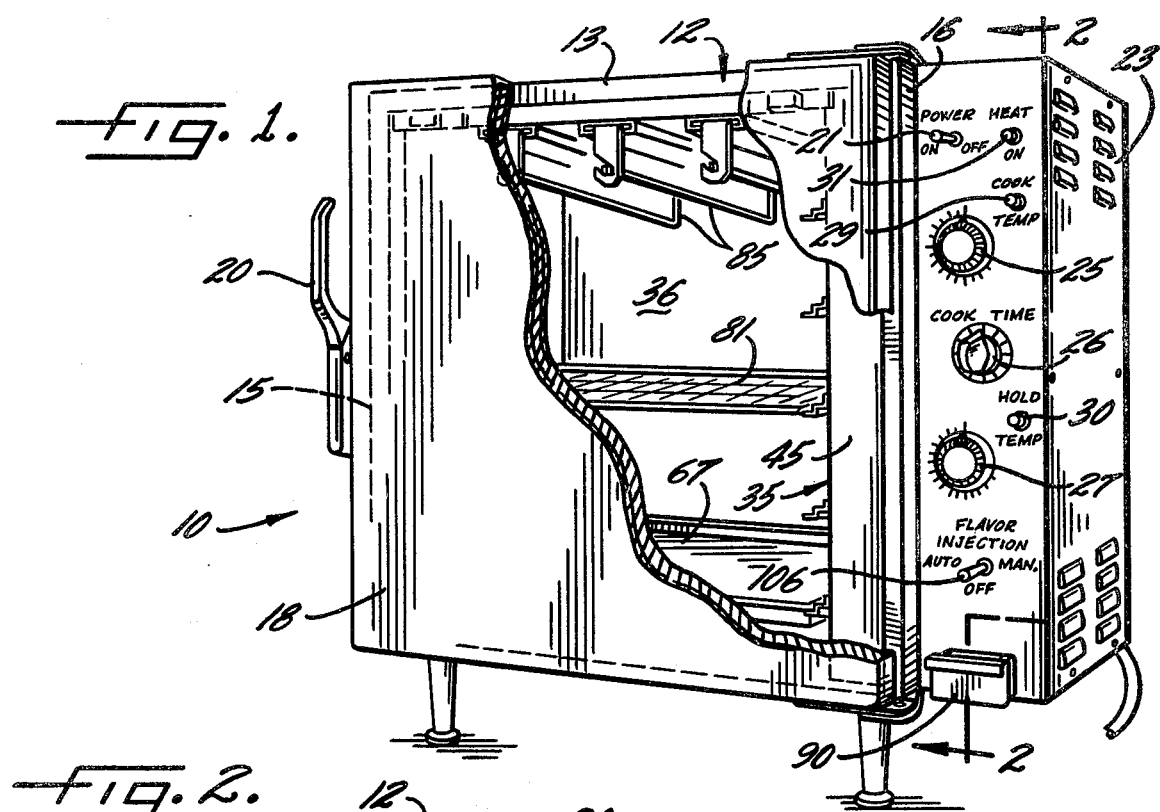
FIG. 1 is a perspective view of a new and improved oven incorporating the unique features of the present invention, a portion of the door of the oven being broken away in order to illustrate the interior of the oven.

As shown in the drawings for purposes of illustration, the invention is embodied in an oven 10 for cooking food products and particularly meat products such as ribs, poultry and the like. The oven is primarily intended for use by restaurants, fast food establishments and delicatessens as opposed either to home use or to use by large bulk commercial meat processors.

The present oven 10 includes a box-like cabinet 12 having a top wall 13 (FIG. 3), a bottom wall 14, two opposing side walls 15 and 16 and a rear wall 17. A door 18 is hinged to the side wall 16 adjacent the front thereof and includes a handle 20 with which the door may be swung between positions opening and closing the front of the cabinet 20. A latching mechanism (not shown) is associated with the side wall 15 and the door 18 to hold the latter releasably in its closed position. The door and the various walls of the cabinet are of double panel, stainless steel construction and are filled with heat-insulating material to help prevent the escape of heat from the cabinet.

Figure 2:
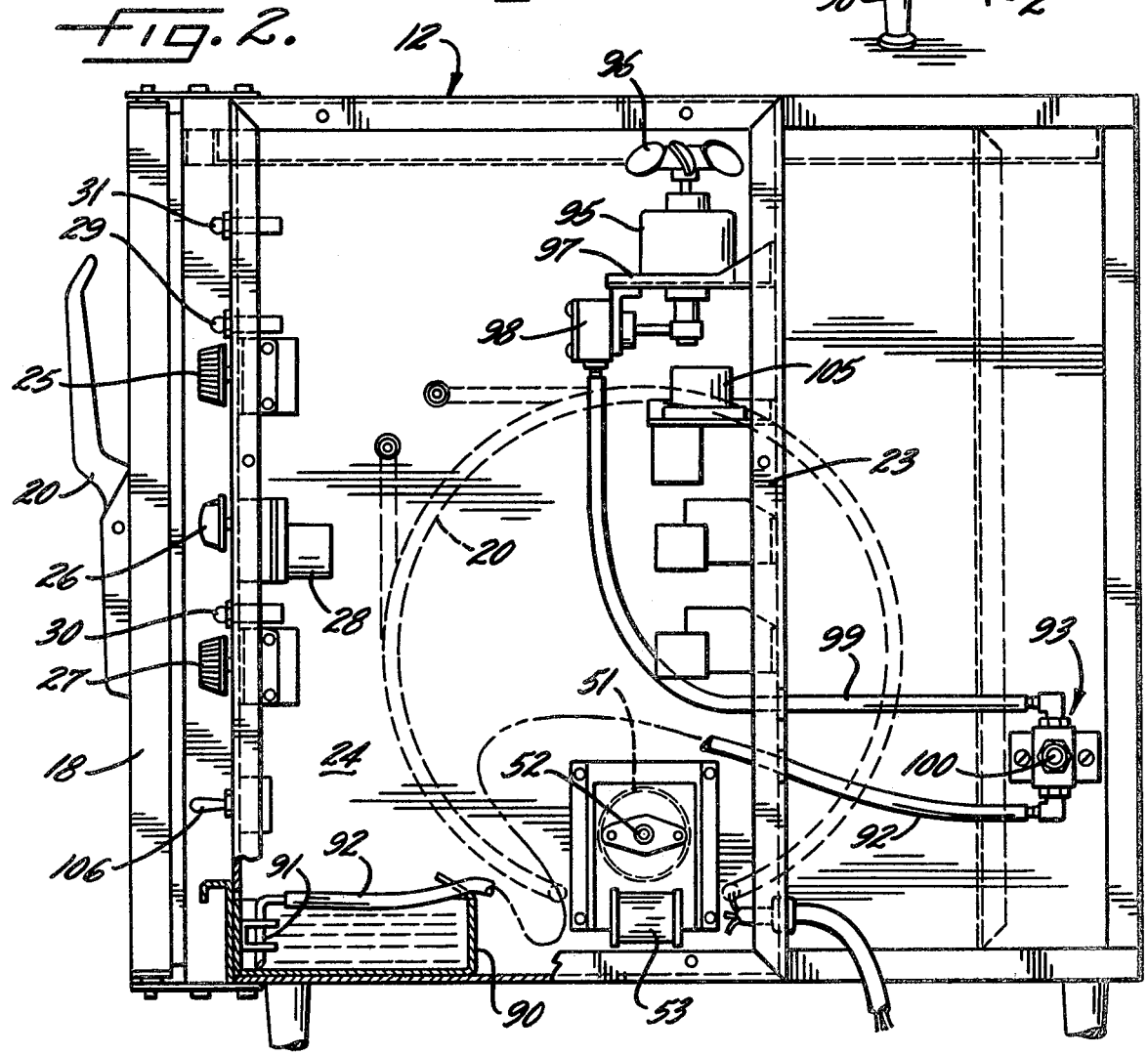
FIG. 2 is an enlarged fragmentary cross-section taken substantially along the line 2—2 of FIG. 1.
Figure 3:
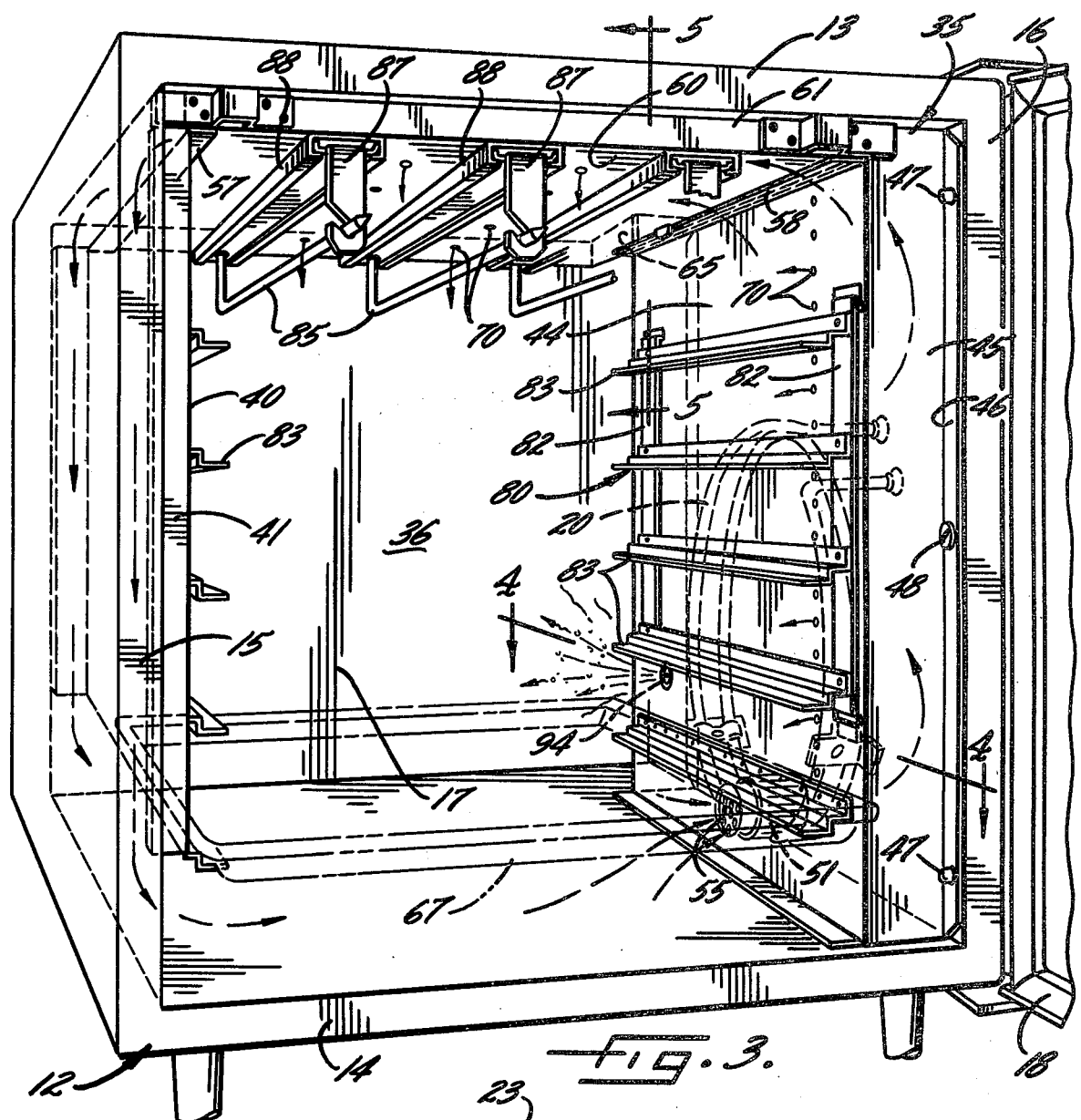
FIG. 3 is a perspective view of the oven with the door being shown in an open position in order to illustrate the interior of the oven.
Figure 4:
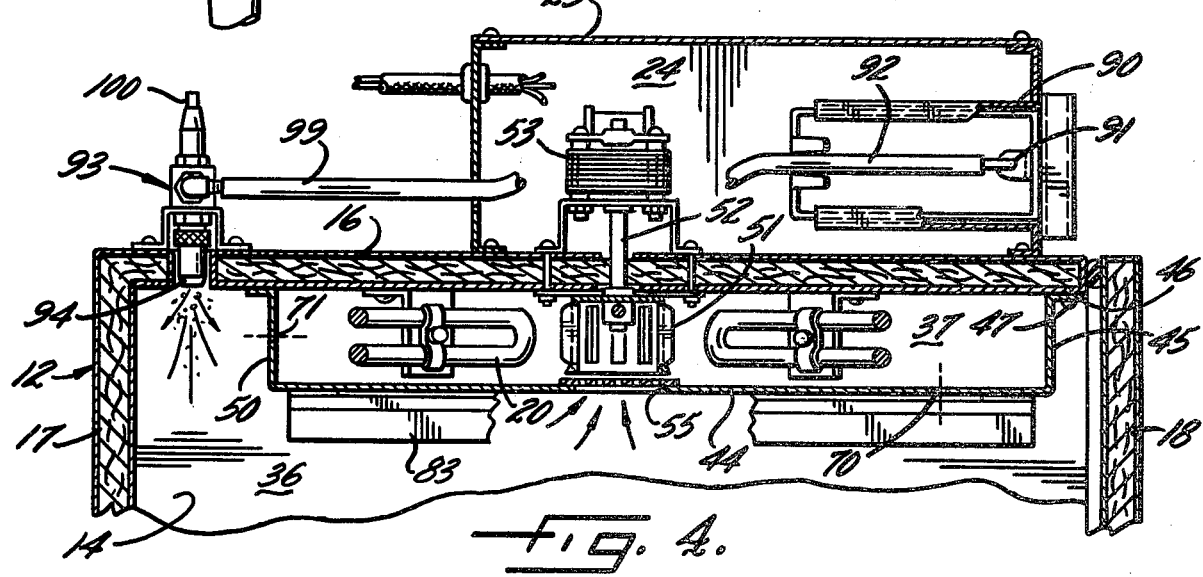
FIGS. 4 and 5 are fragmentary cross-sections taken substantially along the lines 4—4 and 5—5, respectively, of FIG. 3.

As shown in FIGS. 2 to 4, the interior of the cabinet 12 is adapted to be heated by an electrical resistance heating element 20. Herein, the heating element is substantially circular in shape and is connected to the inner side of the side wall 16. The heating element is connected to a conventional 120 volt a.c. voltage source and may be energized when a main power switch 21 (FIG. 1) is located in an "on" position. When the main power switch 21 is in an "off" position, all of the electrical components of the oven 10 are de-energized. The power switch is located at the front of a box-like enclosure or housing 23 attached to the outer side of the side wall 16 of the cabinet 12, there being a compartment 24 (FIGS. 2 and 4) defined inside of the housing 23.

Three control knobs 25, 26 and 27 at the front of the housing 23 control operation of the heating element 20. The knob 25 is a "cook" temperature knob for setting the "cook" temperature of the oven 10 at a desired temperature. The knob 26 controls a timer 28 which, when set to a desired time, initiates the "cook" cycle and causes the oven to remain at the "cook" temperature until the time expires. Thereupon, the oven automatically switches to a "hold" mode and is maintained at a temperature which is controlled by the setting of the knob 27. Indicator lights 29 and 30 on the front of the housing 23 are illuminated when the oven is in the "cook" and "hold" modes, respectively. A third indicating light 31 is illuminated whenever the heating element 20 is energized.

Figure 7:
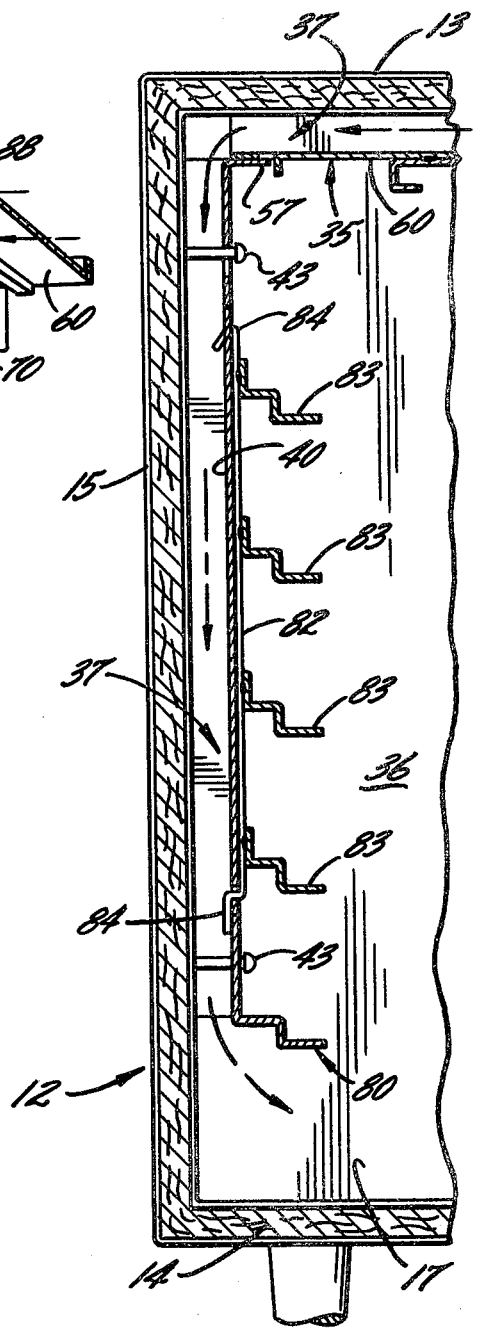
FIG. 7 is an enlarged fragmentary cross-section taken substantially along the line 7—7 of FIG. 6.

Advantageously, the oven 10 is heated by forced air convection in order to promote heating efficiency, to enable substantially uniform heating of the meat product and to reduce shrinkage of the product. For this purpose, an inner jacket 35 is located within the cabinet 12 and its inner sides coact with the rear wall 17 and the door 18 of the cabinet to define a cooking chamber 36 (FIGS. 1 and 7) within the cabinet. The outer sides of the jacket 35 coact with the inner sides of the cabinet to define an air circulation passage 37 (FIGS. 4, 5 and 7) around the cooking chamber. At all times when the power switch 21 is on, air is forced past the heating element 20 with the heated air then flowing through the air circulation passage 37 and around the cooking chamber 36 to heat the cooking chamber and the meat product therein.

Figure 6:
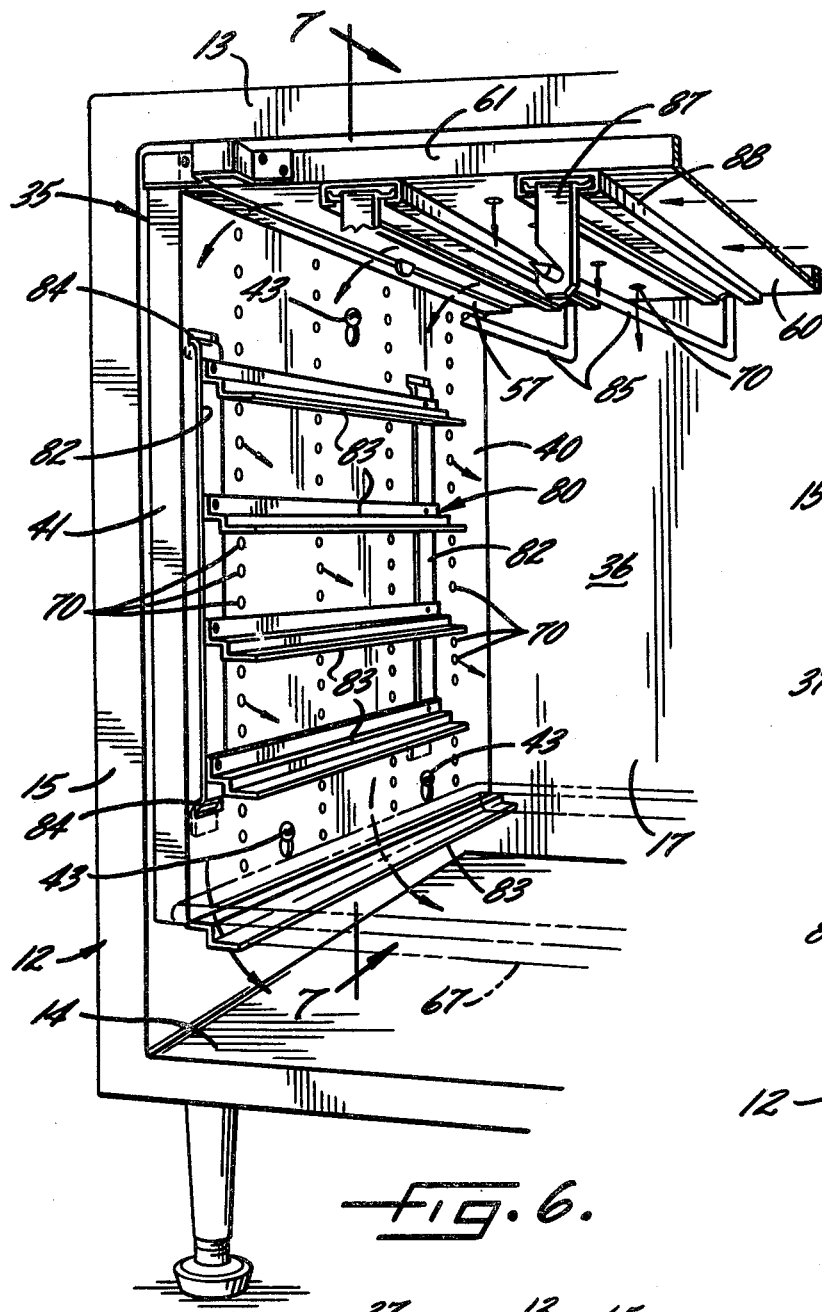
FIG. 6 is a fragmentary perspective view showing a portion of the interior of the oven.

More specifically, the jacket 35 is formed in part by a side panel 40 (FIGS. 6 and 7) which is disposed in spaced opposing relation with the inner side of the side wall 15 of the cabinet 12 so that the space between the side wall 15 and the panel 40 defines part of the air circulation passage 37. The panel 40 extends horizontally from the rear wall 17 of the cabinet 12 to a location closely adjacent the front of the cabinet (see FIG. 6) and extends vertically from a location just short of the top wall 13 of the cabinet to a location spaced a substantial distance above the bottom wall 14 of the cabinet (see FIG. 7). An integral flange 41 (FIGS. 3 and 6) is bent outwardly from the forward edge of the side panel 40 and closes off the front of the air circulation passage 37 adjacent the front of the side wall 15. The side panel 40 is secured to the side wall 15 by screws 43 (FIG. 6) which extend through keyhole-shaped slots in the side panel 40 and which are threaded into the side wall 15.

The jacket 35 further includes a second panel 44 (FIGS. 3 to 5) which is disposed in spaced opposing relation with the side wall 16 with the space between the panel 44 and the wall 16 defining part of the air circulation passage 37. The side panel 44 is substantially coextensive in height with the side wall 16 and its forward edge terminates adjacent the front of the side wall 16. A flange 45 (FIG. 3) is bent outwardly from the side panel 44 and extends toward the side wall 16 to close off the front of the air circulation passage 37 adjacent the side wall 16. Another flange 46 is bent forwardly from the flange 45 and lies alongside the side wall 16. Bosses 47 extend slidably through holes in the flange 46 while a screw 48 extends through another hole in the flange 46 and is threaded into the side wall 16 to secure the side panel 44 to the side wall 16.

As shown in FIG. 4, a flange 50 is bent outwardly from the rear edge of the side panel 44 and extends toward the side wall 16. The flange 50 is spaced a substantial distance forwardly from the rear wall 17 of the cabinet 12. A rotatable squirrel cage fan 51 is centrally located between the flanges 45 and 50 and is disposed within the space between the side panel 44 and the side wall 16. The fan is adapted to be rotated by the drive shaft 52 of an electric motor 53 which is located in the housing 23. As stated above, the fan is rotated whenever the main power switch 21 is on and, when rotated, the fan sucks air trough an inlet opening 55 (FIG. 4) in the panel 44 and forces the air upwardly into the space or passage 37 between the side wall 16 and the side panel 44.

Bent inwardly from the upper edges of the side panels 40 and 44 are flanges 57 and 58, respectively. The flanges 57 and 58 serve to support a slide-in top panel 60 which also forms part of the jacket 35. The top panel 60 is spaced downwardly from the top wall 13 so that the space between the top panel 60 and the top wall 13 forms part of the air circulation passage 37 (see FIGS. 5 and 7). An upwardly bent flange 61 (FIGS. 3 and 6) on the top panel 60 closes off the front of the air circulation passage 37 adjacent the top panel.

Figure 5:
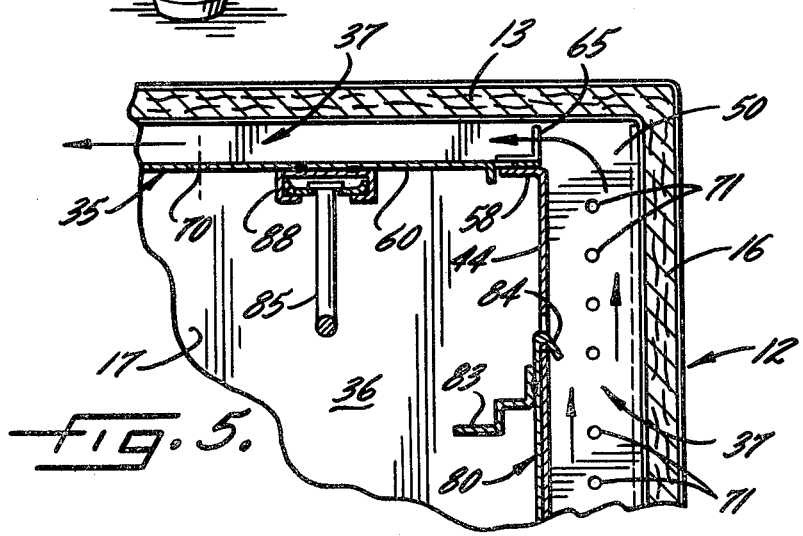

Because the side panel 44 and the flange 58 terminate substantially short of the rear wall 17, means are provided for extending the flange 58 so as to form a continuation of that portion of the air circulation passage 37 which is located rearwardly of the flange 58. Herein, these means comprise an L-shaped member 65 which is positioned as shown in FIGS. 3 and 5.

With the foregoing arrangement, the walls 13, 15 and 16 and panels 41, 44 and 60 form a substantially inverted U-shaped air circulation passage 37 around the cooking chamber 36. When the fan 51 is operated, air is drawn into the inlet opening 55, is heated as it flows upwardly between the side wall 16 and the panel 44, flows horizontally from right to left (FIG. 7) between the top wall 13 and the top panel 60, and then flows downwardly between the side wall 15 and the side panel 40. As the air flows out of the lower end of the space between the side wall 15 and the side panel 40, it flows in the space between the bottom wall 14 of the cabinet 12 and a drip pan 67 (FIGS. 1, 3 and 6) to be described subsequently. That space, therefore, also forms part of the air circulation passage 37. After flowing between the bottom wall 16 and the drip pan 67, the air returns to the inlet opening 55.

Thus, there is a forced flow of air which circulates in a convective pattern to effect efficient and substantially uniform heating of the cooking chamber 36 from the top to the bottom thereof. In addition, there is a slight interchange of air between the air circulation passage 37 and the cooking chamber 36. For this purpose, holes 70 (FIGS. 3 and 6) are formed through the side panels 40 and 44 and the top panel 60 and allow some air to flow between the air circulation passage 37 and the cooking chamber 36. Holes 71 (FIG. 5) also are formed in the flange 50 so that air may flow into the cooking chamber in the vicinity of the flange 50. If desired, the interchange of air between the air circulation passage 37 and the cooking chamber 36 may be increased by placing the drip pan 67 directly on the bottom wall 14 of the cabinet 12 so as to reduce the blockage effect provided by the drip pan when the latter is located in its normal position shown in FIGS. 3 and 6.

The panels 40, 44 and 60 may be easily removed from the cabinet for purposes of cleaning the panels. The top panel 60 may be removed simply by slipping it forward on the flanges 57 and 58. Thereafter, the side panel 40 may be removed by lifting the panel with its keyhole-shaped slots off of the screws 43. The side panel 44 may be removed by loosening the screw 48 and slipping the side panel 44 off of the bosses 47.

A bracket assembly 80 (FIGS. 3 and 6) is detachably supported on each of the side panels 40 and 44 and is adapted to support the drip pan 67 and one or more meat-holding racks or grilles 81 (FIG. 1). Each bracket assembly includes front and rear horizontally spaced upright members 82 and further comprises a plurality of vertically spaced and horizontally extending rack-supporting brackets 83. The brackets 83 extend between and are connected to the upright members 82. Hooks 84 (FIG. 7) are formed on the upper and lower ends of the upright members 82 of each bracket assembly 80 and are adapted to be slipped into holes in the side panels 40 and 44 to attach the bracket assemblies to the panels. The hooks enable the bracket assemblies to be easily removed from the panels for purposes of cleaning the bracket assemblies.

The oven also includes meat-holding skewers 85 (FIG. 6) which are supported by brackets 87. The brackets are slidably received by channel-shaped members 88 on the lower side of the top panel 60 and may be pulled out of the channel-shaped members for cleaning.

In accordance with the primary aspect of the invention, means are provided for spraying liquid smoke or other liquid flavoring agent into the cooking chamber 36 in order to impart a smoke flavor or other desired flavor to the meat. The liquid flavoring agent is clean, non-polluting and easy-to-handle and leaves no ash or similar residue in the oven 10.

Preferably, the liquid flavoring agent is a liquid smoke which imparts a hickory smoked flavor to the meat. The flavoring agent is adapted to be placed in a container which herein is a drawer 90 (FIGS. 1, 2 and 4) guided to slide between open and closed positions within an opening in the front wall of the hourring 23. When open, the drawer may be pulled out of the front of the housing as shown in FIG. 1 to enable the drawer to be easily filled. When closed, the drawer is disposed inside of the compartment 24 and is shielded from dirt and other contamination by the housing 23 as shown in FIG. 2.

As shown in FIG. 2, an L-shaped metal tube 91 is secured to the drawer 90 adjacent the front thereof and extends virtually to the bottom of the drawer. A flexible plastic tube 92 is connected to the rear end of the tube and leads to a nozzle assembly 93. The latter is secured to the side wall 16 of the cabinet 12 and includes a spraying and atomizing nozzle 94 which is located adjacent the rear flange 50 of the side panel 44 so as to be capable of spraying directly into the cooking chamber 36.

The liquid smoke in the drawer 90 is sucked therefrom, is delivered to the nozzle assembly 93 through the tube 92 and is atomized and sprayed as a fine mist into the cooking chamber 36 by the nozzle 94. To this end, a motor 95 (FIG. 2) which is cooled by a fan 96 is supported by a bracket 97 in the housing 23 and is connected to drive an air compressor 98 which also is supported by the bracket 97. The outlet of the compressor is connected to the nozzle assembly 93 by a tube 99. When the compressor is driven, pressurized air delivered to the nozzle assembly 93 by way of the tube 99 causes the liquid smoke in the drawer 90 to be sucked into the nozzle assembly through the tube 92 and, in addition, causes the liquid smoke to be atomized and sprayed by the nozzle 94. Thus, a fine mist or fog of liquid smoke is introduced into the cooking chamber 36 to impart a smoked taste to the meat. The use of the liquid smoke requires no exhaust stack and leaves the cooking chamber 36 relatively clean. Water may be periodically placed in the drawer 90 to flush and clean the system. Also, a spring-loaded push button 100 (FIG. 4) on the nozzle assembly 93 may be periodically depressed to force a cleaning needle (not shown) into the nozzle 94.

Advantageously, the liquid smoke may be injected automatically into the cooking chamber 36 at periodic intervals. Thus, a timer 105 (FIG. 2) is disposed in the housing 23 to control operation of the compressor 98. When a flavor injection switch 106 (FIGS. 1 and 2) on the front of the housing 23 is placed in an "auto" mode, the timer 105 is set and causes the compressor to operate for a short time period while the oven 10 is in its "cook" mode. For example, the timer may be set to cause liquid smoke to be injected into the cooking chamber 36 for a period of one minute for every thirty minutes that the oven is in its "cook" mode. Thus, a substantially uniform quantity of smoke may be sprayed into the oven during a given cooking cycle. If desired, the flavor injection switch 106 may be switched to a "manual" position in order to bypass the timer 105 and add additional liquid smoke to the cooking chamber 36. When the switch 106 is in its "off" position, no liquid smoke is injected and thus the oven 10 may be used to cook meat without imparting additional flavor thereto.

I claim:

1. An oven for cooking and flavoring meat products, said oven comprising a box-like cabinet having a top wall, a bottom wall, first and second opposing side walls and a rear wall, the front of said cabinet being open, a door connected to said cabinet and adapted to be moved between positions opening and closing the front of said cabinet, jacket means disposed in spaced opposing relation with the inner sides of said top, bottom and side walls and coacting with said rear wall and said door to define a cooking chamber within said cabinet, the outer sides of said jacket means coacting with the inner sides of said top, bottom and side walls to define an air circulation passage between such walls and said jacket means, an electric heating element disposed within said air circulation passage for heating the air in such passage, a fan disposed in said air circulation passage for circulating the heated air around said air circulation passage, a container located adjacent said cabinet and adapted to hold a liquid flavoring agent, and power-operated means for sucking the flavoring agent from said container, for atomizing the flavoring agent and for spraying the atomized flavoring agent into said cooking chamber.

2. An oven as defined in claim 1 in which said power-operated means comprise a nozzle assembly having an atomizing nozzle, an air compressor, a first tube connecting said nozzle assembly to said compressor, a second tube connecting said nozzle assembly to said container, and a motor connected to drive said compressor, said compressor being operable when driven to force compressed air through said first tube and to said nozzle assembly with such air being effective to suck the flavoring agent from said container and into said nozzle assembly and then to spray the flavoring agent into said cooking chamber through said atomizing nozzle.

3. An oven as defined in claim 2 further including timing means operable to periodically cause said motor to be energized for a relatively short predetermined time interval and then to cause said motor to be de-energized for a longer predetermined time interval whereby the liquid flavoring agent is periodically sprayed into said cooking chamber.

4. An oven as defined in claim 2 further including an enclosure defining a compartment adjacent the outer side of one of said side walls, said compressor and said motor being disposed in said compartment, said container comprising a drawer supported by said enclosure to slide between open and closed positions, said drawer being located inside of said compartment and being protected by said enclosure when said drawer is in its closed position, said drawer being located outside of the front of said compartment and being accessible for filling with flavoring agent when said drawer is in its open position.

5. An oven as defined in claim 1 in which said jacket means comprise a top panel disposed in spaced opposing relation with the lower side of said top wall of said cabinet, said jacket means further comprising first and second side panels disposed in spaced opposing relation with the inner sides of the first and second side walls, respectively, of said cabinet, and flanges on the front of said panels and extending toward the respective opposing walls to close off the front of said air circulation passage.

6. An oven as defined in claim 5 in which said heating element and said fan are located between one of said side panels and the opposing wall of said cabinet.

7. An oven as defined in claim 6 in which said panels are detachably secured to the respective opposing walls of said cabinet whereby said panels may be easily removed from said cabinet for cleaning.

8. An oven as defined in claim 7 further including a bracket assembly on the inside of each of said side panels, each bracket assembly comprising front and rear horizontally spaced upright members and further comprising a plurality of vertically spaced and horizontally extending rack-supporting brackets extending between and connected to said front and rear members, and means detachably connecting the front and rear members of each bracket assembly to the respective side panel whereby the bracket assembly may be easily removed from the side panel for cleaning.

* * * * *